(12) United States Patent
Groh (10) Patent No.: US 11,580,332 B2
(45) Date of Patent: Feb. 14, 2023

(54) METHOD AND DEVICE FOR RELIABLY IDENTIFYING OBJECTS IN VIDEO IMAGES

(71) Applicant: Robert Bosch GmbH, Stuttgart (DE)

(72) Inventor: Konrad Groh, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 16/903,974

(22) Filed: Jun. 17, 2020

(65) Prior Publication Data

US 2020/0410294 A1    Dec. 31, 2020

(30) Foreign Application Priority Data

Jun. 25, 2019 (DE) .......................... 102019209152.0

(51) Int. Cl.
| | |
|---|---|
| *G06K 9/62* | (2022.01) |
| *G06N 5/04* | (2006.01) |
| *G06N 20/00* | (2019.01) |
| *G06V 10/141* | (2022.01) |
| *G06V 20/40* | (2022.01) |

(52) U.S. Cl.
CPC ......... *G06K 9/6257* (2013.01); *G06K 9/6262* (2013.01); *G06N 5/04* (2013.01); *G06N 20/00* (2019.01); *G06V 10/141* (2022.01); *G06V 20/40* (2022.01)

(58) Field of Classification Search
None
See application file for complete search history.

(56) References Cited

U.S. PATENT DOCUMENTS

| | | | |
|---|---|---|---|
| 9,652,980 B2 | 5/2017 | Zhang et al. | |
| 10,235,601 B1 | 3/2019 | Wrenninge et al. | |
| 2007/0263901 A1* | 11/2007 | Wu | ...................... G06V 20/584 382/104 |
| 2010/0091513 A1* | 4/2010 | Kamioka | ............. G06V 20/584 348/148 |
| 2013/0027511 A1* | 1/2013 | Takemura | ............ G06V 20/588 348/42 |

(Continued)

FOREIGN PATENT DOCUMENTS

DE    102017223264 A1    6/2019

OTHER PUBLICATIONS

Almagambeiov, et al.: "Robust and Computationally Lightweight Autonomous Tracking of Vehicle Taillights and Signal Detection by Embedded Smart Cameras,", In: IEEE Transactions on Industrial Electronics, 62(6): 3732-3741, (2015); URL:https://ieeexplore.ieee.org/iel7 /41/4387790/07031905. pdf [accessed Jun. 5, 2020].

(Continued)

*Primary Examiner* — Wen W Huang
(74) *Attorney, Agent, or Firm* — Norton Rose Fulbright US LLP; Gerard Messina (57) ABSTRACT

A computer-implemented method for reliably identifying objects in a sequence of input images received with the aid of an imaging sensor, positions of light sources in the respective input image being ascertained from the input images in each case with the aid of a first machine learning system, in particular, an artificial neural network, and objects from the sequence of input images being identified from the resulting sequence of positions of light sources, in particular, with the aid of a second machine learning system, in particular, with the aid of an artificial neural network.

9 Claims, 9 Drawing Sheets

(56) References Cited

U.S. PATENT DOCUMENTS

| | | | | |
|---|---|---|---|---|
| 2014/0098997 | A1* | 4/2014 | Faber | B60Q 1/143 |
| | | | | 382/103 |
| 2014/0132769 | A1* | 5/2014 | Kido | G06V 20/58 |
| | | | | 382/104 |
| 2014/0355827 | A1* | 12/2014 | Ogawa | G06V 20/56 |
| | | | | 382/103 |
| 2015/0278616 | A1* | 10/2015 | Li | G06T 7/194 |
| | | | | 382/103 |
| 2017/0076463 | A1* | 3/2017 | Nishijima | G06T 7/0002 |
| 2018/0211120 | A1* | 7/2018 | Smith | G06V 20/584 |
| 2018/0336692 | A1* | 11/2018 | Wendel | B60W 30/095 |
| 2019/0278273 | A1* | 9/2019 | Behrendt | B60W 50/0097 |
| 2019/0318490 | A1* | 10/2019 | Andelic | G06V 20/584 |
| 2019/0354786 | A1* | 11/2019 | Lee | G05D 1/0246 |
| 2020/0089954 | A1* | 3/2020 | Zia | G06V 20/64 |
| 2020/0160107 | A1* | 5/2020 | Soltani Bozchalooi | |
| | | | | G06V 10/143 |
| 2020/0410270 | A1* | 12/2020 | Naruse | G06N 3/04 |
| 2021/0232840 | A1* | 7/2021 | Shiraishi | G06V 10/245 |
| 2021/0271878 | A1* | 9/2021 | Qian | G06V 10/143 |

OTHER PUBLICATIONS

Lee, et al.: "An Attention-based Recurrent Convolutional Network for Vehicle Taillight Recognition," 2019 IEEE Intelligent Vehicles Symposium (IV). IEEE, (2019), pp. 2365-2370; URL:https://ieeexplore.ieee.org/i.el7/8792328/8813768/08814278.pdf [accessed Jun. 5, 2020].

Zou, et al.: "Robust Nighttime Vehicle Detection by Tracking and Grouping Headlights," In: IEEE Transactions on Intelligent Transportation Systems, 16( 5): 2838-2849, (2015); URL: https://ieeexplore. ieee. rg/el7/6979/4358928/07111283.pdf [accessed Apr. 5, 2020].

\* cited by examiner

METHOD AND DEVICE FOR RELIABLY IDENTIFYING OBJECTS IN VIDEO IMAGES

CROSS REFERENCE

The present application claims the benefit under 35 U.S.C. § 119 of German Patent Application No. DE 102019209152.0 filed on Jun. 25, 2019, which is expressly incorporated herein by reference.

FIELD

The present invention relates to a method for reliably identifying objects within an image detected by an imaging sensor, a system, which is configured to carry out this method, methods for training this system, a training device, a computer program and a machine-readable memory medium.

BACKGROUND INFORMATION

A method is described in German Patent Application No. DE 10 2017 223 264.1 for detecting an object in a provided input signal, an object being detected as a function of the provided input signal and an activation of an actuator taking place as a function of the detection of the object.

SUMMARY

The present invention includes a visual sensor, which supplies input images, for example, for an automated driving function, even in the case of poorly illuminated scenes with active light sources also visible in the image.

In such cases, it may be that the input images are poorly adjusted. This may mean that only light sources visible in the image such as vehicle headlights, street lights, advertising boards and the like are visible.

With a normalization, it is possible to adjust the image, but this potentially means that the surroundings are now visible, but the position of the light sources is not clearly determinable.

If a machine learning system is taught to identify objects in the input images, then it cannot be ruled out that light sources are associated with vehicles and/or other objects. This may mean that each light source automatically leads to a detected object.

This results in the problem that reflections caused, for example, by wet roadways, reflecting road concrete, tunnel walls, etc., are identified as ghost objects.

It is practically not possible in the training of the machine learning system to provide a dataset of real training data, in which all potential light sources and reflections are included.

An example method in accordance with the present invention may have the advantage that light intensities are locally adapted, so that cross-fading does not occur.

The example method is also trainable using a simulation of moved and unmoved light sources, in which reflections and overlappings may be synthetically generated for all relevant cases.

Additional aspects of the present invention are described herein Advantageous refinements of the present invention are described herein.

In a first aspect, the present invention relates to a computer-implemented method for reliably identifying objects in a sequence of input images received with the aid of an imaging sensor, in each case positions of light sources in the respective input image being ascertained from the input images with the aid of a first machine learning system, in particular, of an artificial neural network, and objects being identified from the sequence of input images based on the resulting sequence of positions of light sources, in particular, with the aid of a second machine learning system such as, for example, an artificial neural network.

This processing sequence has the advantage that the complex task of also distinguishing light sources from reflections, and also of reliably identifying at least partially overlapped light sources, may be transferred to a machine learning system trainable with a reasonable effort. The objects may then be identified in a particularly simple manner from the identified light sources. This task as well is in turn readily transferrable to an easily trainable machine learning system.

In one refinement of the present invention, it may be provided that in addition to the identified objects, attributes, in particular, of the identified objects are also identified in the sequence of input images, in particular, with the aid of the second machine learning system. This may be implemented with the second machine learning system in a particularly simple manner. Attributes may, for example, be a ($3d$-) position of the object recorded with the aid of the sensor, a ($3d$-) velocity of this object, or also an intrinsic velocity of the sensor which, together with the ($3d$-) velocity of the object, characterizes a relative velocity between the sensor and the object.

Alternatively or in addition in accordance with the present invention, it may be provided that a normalization of the respective input image may also be ascertained, in particular, with the aid of the first machine learning system. A normalization may mean, in particular, that a possible cross-fading present in the input image is no longer present in the normalization. With such a normalization, it is possible to provide in a particularly efficient manner an additional information source, with which objects may also be identified. It is particularly advantageous that the first machine learning system carries out both the normalization, i.e., a removal of cross-fading caused by the light sources, as well as the identification of the positions of the light sources, since the information content necessary for each of the two respective actions strongly correlates. Thus, it is possible to train this machine learning system in a particularly efficient manner.

In order to then also utilize this information source, it may then be provided in one refinement that, based on the normalization of the respective input image, objects in the respective input image and their positions in the input image are identified with the aid of a third machine learning system. A design as a machine learning system is particularly simple here because the machine learning system is trainable in a particularly simple manner.

In one further aspect of the present invention, it may be provided that a fusion of the objects identified in alternative ways takes place with the aid of a fourth machine learning system, i.e., that this machine learning system identifies reliably ascertained objects in the input image based on the objects identified with the aid of the third machine learning system and based on the objects identified from the sequence of the positions of the light sources and, in particular, also based on the identified attributes.

In further aspects, the present invention relates to a system, which is configured to carry out one of the aforementioned methods, including the first machine learning system and the second machine learning system, optionally, also the third machine learning system and/or the fourth machine learning system.

Following on the foregoing in still a further aspect of the present invention, a computer-implemented method for training one of these systems is provided, a scene including objects and light sources at predefinable positions in space being generated and a sequence of synthetic positions of light sources being generated based on the scene, as they would be recorded by a camera from a predefinable camera position, the second machine learning system being trained to derive the positions of the objects based on the positions of the light sources just as they would be recorded by the camera from the predefinable camera position. This has the advantage that positions of light sources may be realistically generated in the simplest manner and thus training data are particularly easy to generate for a multitude of conceivable scenarios, so that the trained system functions in a particularly reliable manner.

In one refinement of the present invention, it may be provided that the first machine learning system is trained using a dataset, which includes pairs made up of augmented images and associated predefinable positions, the augmented images having been obtained by artificially adding light sources to real images at predefinable positions, and the first machine learning system being trained to ascertain the predefinable positions based on the augmented images. This utilizes in a particularly advantageous manner the fact that a large multitude of images having real light sources are difficult to produce with an adequate multitude of reflections, etc., but that light sources may be artificially added to real images, i.e., recorded with a sensor, in a comparatively simple manner, for example, with the aid of ray tracing methods.

In one refinement thereof, it may be provided that the first machine learning system is further trained using a dataset, which also includes pairs of real images and associated augmented images, and the first machine learning system being trained to ascertain as normalized data the associated real images based on the augmented images. In this way, it is possible to train the first machine learning system in a particularly simple manner in such a way that it is able to subtract light sources from images.

In further aspects, the present invention relates to a computer program, which is configured to carry out the above methods and a machine-readable memory medium on which this computer program is stored.

Specific embodiments of the present invention are explained in greater detail below with reference to the figures.

DETAILED DESCRIPTION OF EXAMPLE EMBODIMENTS

Figure 1:
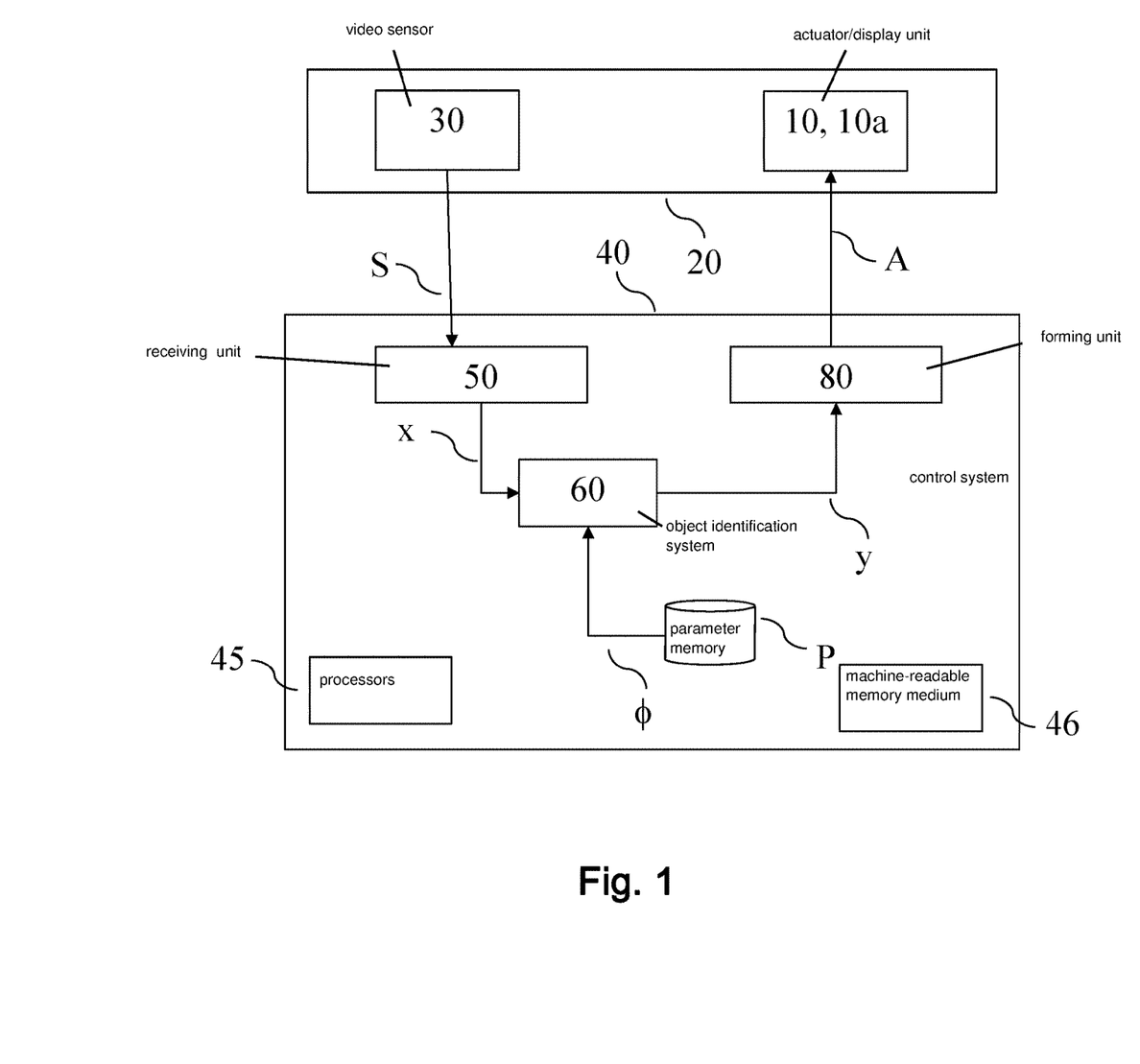
FIG. 1 schematically shows a layout of one specific embodiment of the present invention.

FIG. 1 shows an actuator 10 in its surroundings 20 interacting with a control system 40. Surroundings 20 are detected at preferably regular time internals in a video sensor 30, which may also be provided as a plurality of sensors, for example, a stereo camera. Sensor signal S—or one sensor signal S each in the case of multiple sensors—of sensor 30 is conveyed to control system 40. Control system 40 thus receives a sequence of sensor signals S. Based on this sequence, control system 40 ascertains activation signals A, which are transmitted to actuator 10.

Control system 40 receives the sequence of sensor signals S of sensor 30 in an optional receiving unit 50, which converts the sequence of sensor signals S into a sequence of input images x (alternatively, sensor signal S may in each case also be directly adopted as input image x). Input image x may, for example, be a section or a further processing of sensor signal S. Input image x includes individual frames of a video recording. In other words, input image x is ascertained as a function of sensor signal S. The sequence of input images x is fed to an object identification system 60.

Object identification system 60 is preferably parameterized by parameter (1), which is stored in and provided by a parameter memory P.

Object identification system 60 ascertains output variables y based on input images x. Output images y are fed to an optional forming unit 80, which ascertains therefrom activation signals A which are fed to actuator 10, in order to activate actuator 10 accordingly. Output variable y includes pieces of information about objects detected by video sensor 30.

Actuator 10 receives activation signals A, is activated accordingly and carries out a corresponding action. Actuator 10 in this case may include an (not necessarily structurally integrated) activation logic, which ascertains from activation signal A a second activation signal, with which actuator 10 is then activated.

In further specific embodiments, control system 40 includes sensor 30. In still further specific embodiments, control system 40 alternatively or in addition includes actuator 10.

In further preferred specific embodiments, control system 40 includes a single or a plurality of processors 45 and at least one machine-readable memory medium 46 on which instructions are stored, which then prompt control system 40, when they are executed on processors 45, to carry out the method according to the present invention.

In alternative specific embodiments, a display unit 10a is provided alternatively or in addition to actuator 10.

Figure 2:
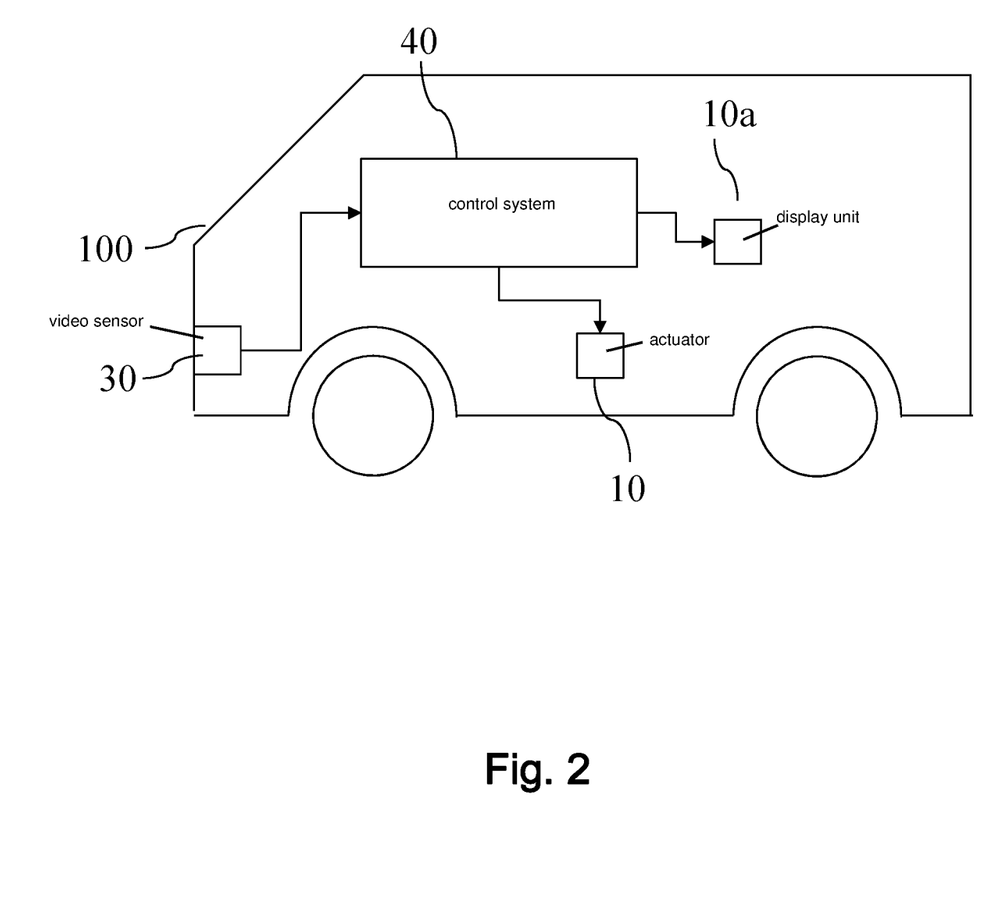
FIG. 2 schematically shows one exemplary embodiment for controlling an at least semiautonomous robot.

FIG. 2 shows how control system 40 may be used to control an at least semiautonomous robot, in this case an at least semiautonomous motor vehicle 100.

Sensor 30 may, for example, be a video sensor situated preferably in motor vehicle 100.

Object identification system 60 is configured to reliably identify objects based on input images x.

Actuator 10 situated preferably in motor vehicle 100 may, for example, be a brake, a drive or a steering of motor vehicle 100. Activation signal A may then be ascertained in such a way that the actuator or actuators 10 are activated in such a way that motor vehicle 100 prevents, for example, a collision with objects reliably identified by object identification system 60, in particular, if they are objects of particular classes, for example, pedestrians.

Alternatively, the at least semiautonomous robot may also be another mobile robot (not depicted), for example, one that moves by flying, floating, diving or stepping. The mobile robot may, for example, be an at least semiautonomous lawn mower or an at least semiautonomous cleaning robot. In these cases as well, activation signal A may be ascertained in such a way that the drive and/or the steering of the mobile robot is activated in such a way that, for example, the at least semiautonomous robot prevents, for example, a collision with objects identified by object identification system 60.

Alternatively or in addition, display unit 10*a* may be activated with activation signal A and, for example, the ascertained safe areas may be displayed. It is also possible, for example, in the case of a motor vehicle 100 having non-automated steering that display unit 10*a* is activated with activation signal A in such a way that it outputs a visual or acoustic alert signal if it is ascertained that motor vehicle 100 threatens to collide with one of the reliably identified objects.

Figure 3:
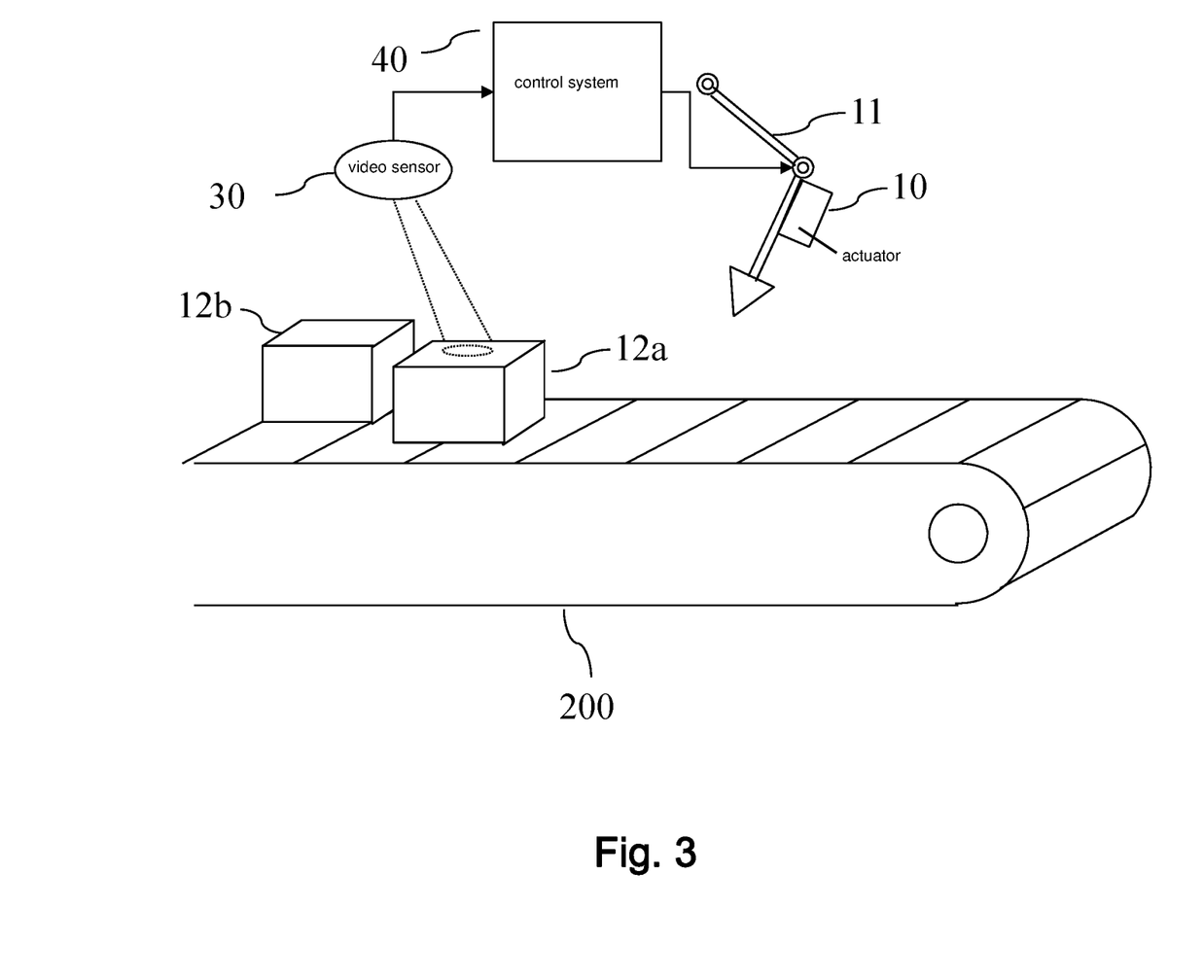
FIG. 3 schematically shows one exemplary embodiment for controlling a manufacturing system.

FIG. 3 shows one exemplary embodiment, in which control system 40 is used for activating a manufacturing machine 11 of a manufacturing system 200 by activating an actuator 10 that controls this manufacturing machine 11. Manufacturing machine 11 may be a machine for punching, sawing, drilling and/or cutting.

Sensor 30 may, for example, be a visual sensor which, for example, detects properties of manufactured products 12*a*, 12*b*. It is possible that these manufactured products 12*a*, 12*b* are movable. It is possible that actuator 10 controlling manufacturing machine 11 is controlled as a function of an assignment of detected manufactured products 12*a*, 12*b*, so that manufacturing machine 11 accordingly carries out a subsequent processing step of the correct one of manufactured products 12*a*, 12*b*. It is also possible that by identifying the correct properties of the same one of manufacturing products 12*a*, 12*b* (i.e., without a misclassification), manufacturing machine 11 accordingly adapts the same manufacturing step for a processing of a subsequent manufactured product.

Figure 4:
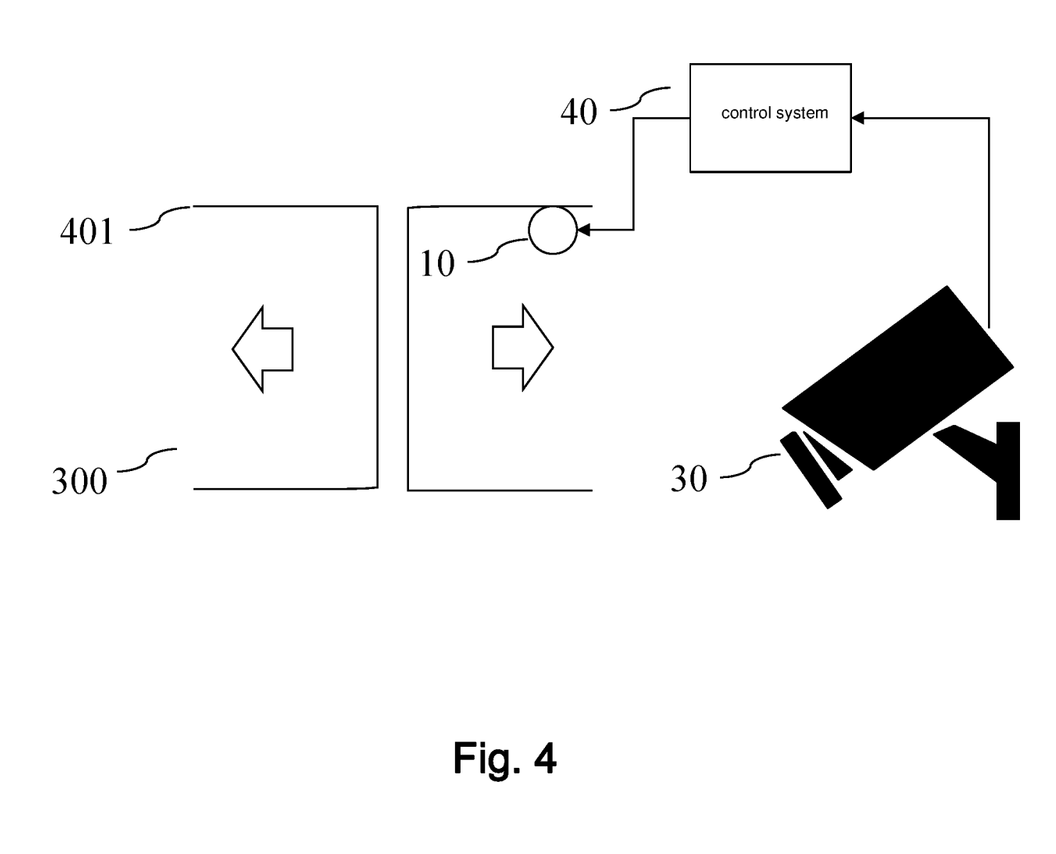
FIG. 4 schematically shows one exemplary embodiment for controlling an access system.

FIG. 4 shows one exemplary embodiment, in which control system 40 is used to control an access system 300. Access system 300 may include a physical access control, for example, a door 401. Video sensor 30 is configured to detect a person. With the aid of object identification system 60, it is possible to interpret this detected image. If multiple persons are detected simultaneously, it is possible, for example, to particularly reliably ascertain the identity of the persons by classifying the persons (i.e., the objects) relative to one another, for example, by analyzing their movements. Actuator 10 may be a lock, which releases or does not release the access control as a function of activation signal A, for example, opens or does not open door 401. For this purpose, activation signal A may be selected as a function of the interpretation of object identification system 60, for example, as a function of the ascertained identity of the person. Instead of the physical access control, it is also possible to provide a logical access control.

Figure 5:
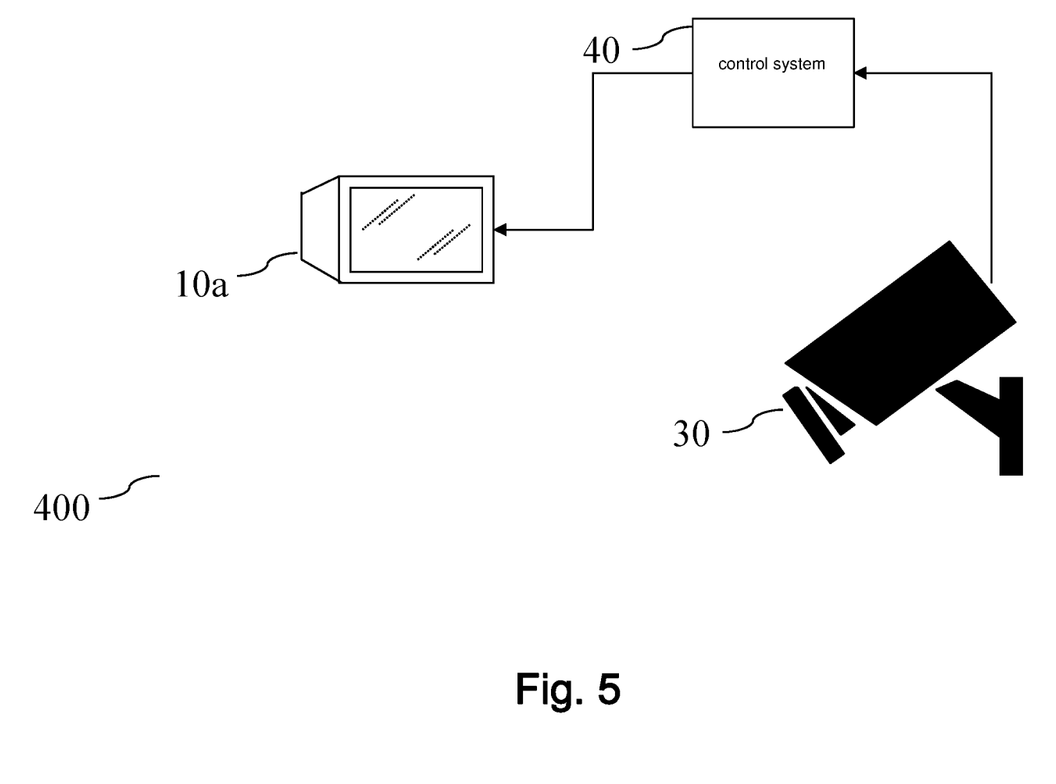
FIG. 5 schematically shows one exemplary embodiment for controlling a monitoring system.

FIG. 5 shows one exemplary embodiment, in which control system 40 is used for controlling a monitoring system 400. This exemplary embodiment differs from the exemplary embodiment depicted in FIG. 4 in that instead of actuator 10, display unit 10*a* is provided, which is activated by control system 40. An identity of the objects recorded by video sensor 30 may, for example, be reliably ascertained by object identification system 60 in order, for example, to conclude which ones become suspect, and activation signal A is then selected in such a way that this object is represented by display unit 10*a* in a color highlighted manner.

Figure 6:
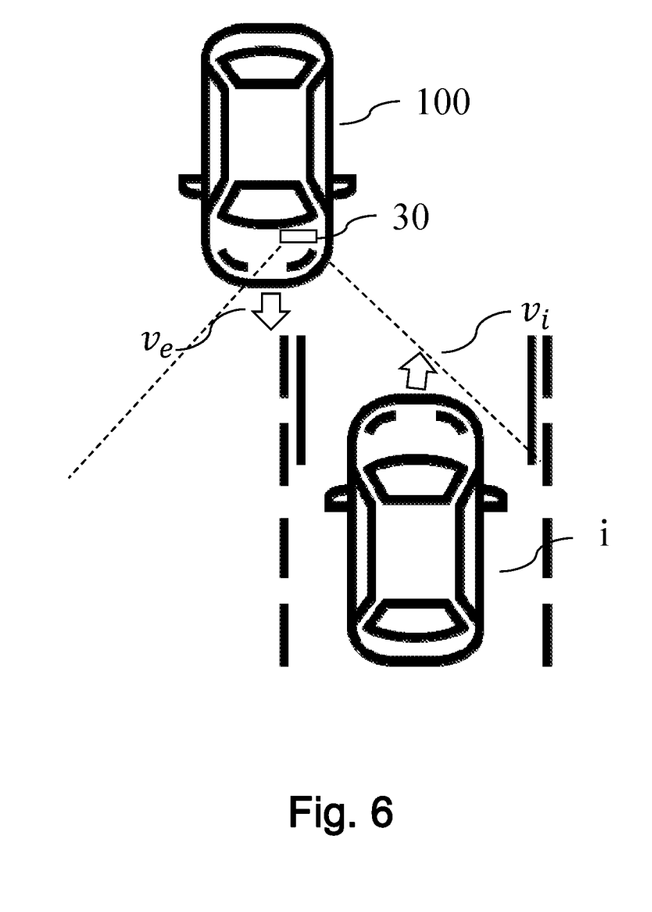
FIG. 6 shows an exemplary scene in which an object is detected with the aid of the sensor.

FIG. 6 shows an exemplary real scene, in which motor vehicle 100 equipped with sensor 30, also referred to as an ego vehicle, moves at an ego velocity $v_e$ and records an object i, in the illustrated example, another vehicle, which moves at a velocity $v_i$.

Figure 7:
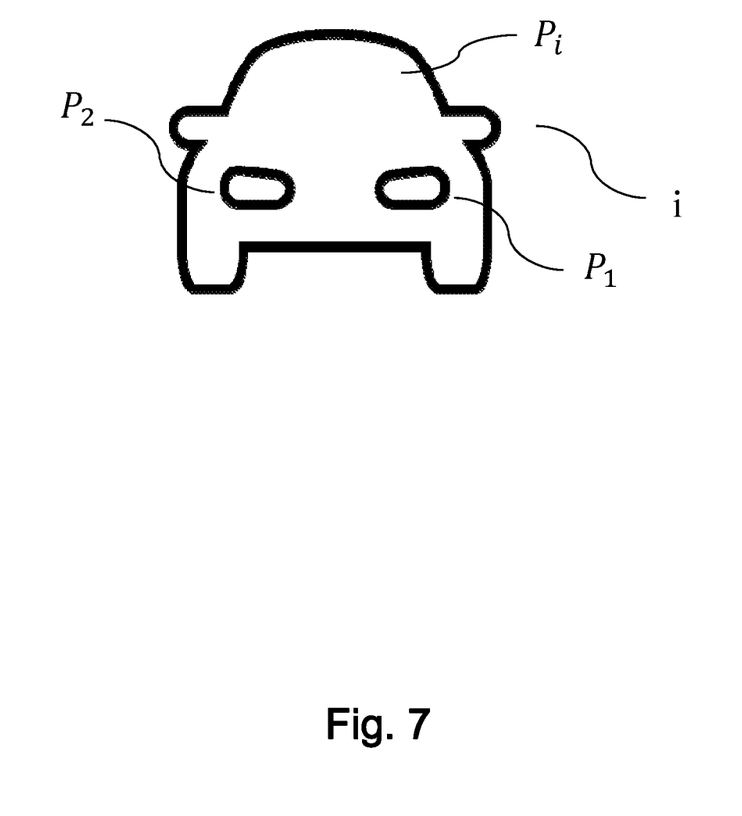
FIG. 7 shows an exemplary outline of the scene detected by the sensor.

FIG. 7 schematically shows a view of this object L, as it may be recorded by sensor 30. Object i has two headlights, a first headlight at a first position $P_1$ and a second headlight at a second position $P_2$, which may result in cross-fading in the image. Object i is located in a position $P_i$ in the recorded image.

Figure 8:
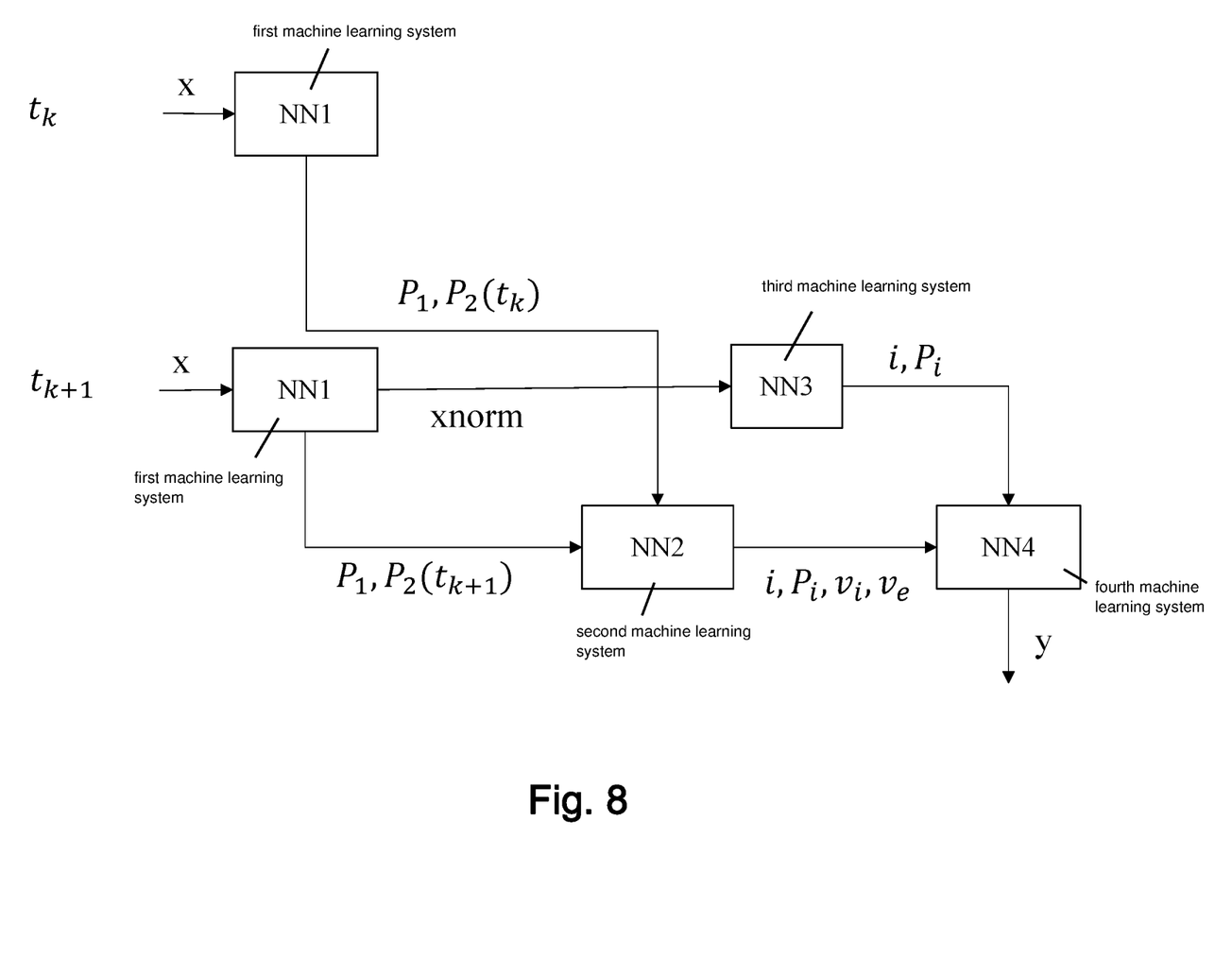
FIG. 8 shows an exemplary information flow in the aforementioned system.

FIG. 8 shows by way of example the information flow in object identification system 60. The latter is fed one input image x, respectively at consecutive points in time $t_k, t_{k+1}$. First machine learning system NN1 ascertains therefrom positions $P_1, P_2(t_k)$ of the light sources in the input image at first point in time $t_k$, and positions $P_1, P_2(t_{k+1})$ of the light sources in the input image at later second point in time $t_{k+1}$. These positions $P_1, P_2$ of the light sources may, for example, be described by a semantically segmented image, which has the classes "light source" and "no light source." Both ascertained positions are fed to second machine learning system NN2 which ascertains therefrom object i, its position $P_i$, its velocity $v_i$ (or a list of the objects and their respective attributes) and ego-velocity $v_e$.

First machine learning system NN1 further ascertains from input image x its associated normalization xnorm and feeds it to third machine learning system NN3 which ascertains therefrom also object i and its position $P_i$ (or a list of the objects and their respective positions).

Object i ascertained by second machine learning system NN2, its position $P_i$, its velocity $v_i$ (or the list of the objects and their respective attributes) and ego velocity $v_e$, as well as object i and its position $P_i$ (or the corresponding list) are conveyed to fourth machine learning system NN4. The latter ascertains therefrom output signal y, which includes pieces of information about reliably ascertained object i and its reliably ascertained position $P_i$ (or a list of the objects and their associated reliably ascertained positions).

Each of these four machine learning systems may, for example, be provided by an artificial neural network. The method illustrated here may be implemented as a computer program and stored in machine-readable memory medium 46.

Figure 9:
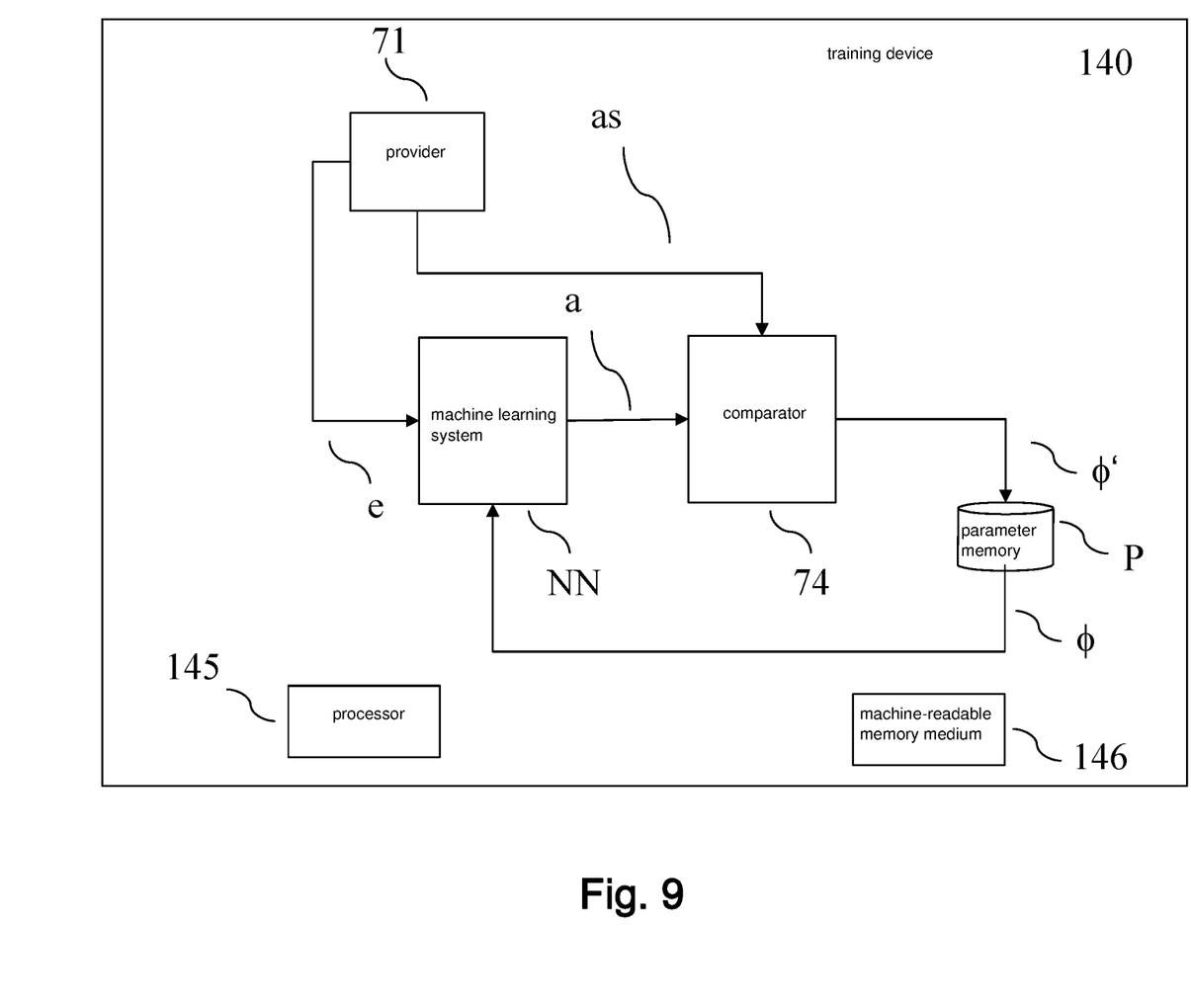
FIG. 9 shows one possible layout of a training device.

FIG. 9 shows a possible structure of a training device 140 for training object identification system 60. This structure is parameterized with parameters ϕ, which are provided by a parameter memory P.

Training device 140 is able to train each of the four machine learning systems NN1, . . . , NN4. The machine learning system to be respectively trained is marked with reference sign NN.

Training device 140 includes a provider 71, which provides input variables e and setpoint output variables as. Input variable e is fed to machine learning system NN to be trained, which ascertains therefrom output variables a. Output variables a and setpoint output variables as are fed to a comparator 74, which ascertains therefrom as a function of a correlation between respective output variables a and setpoint variables as, new parameters ϕ', which are conveyed to parameter memory P where they replace parameter ϕ.

In the first step, first machine learning system NN1 is also trained, which is intended to determine the position of the light sources and to normalize the input images. In this case, artificial light sources are added to real images xr, which are provided, for example, from a database, at predefinable positions $P_{1,s}, P_{2,s}$. This results in an augmented image xa. This is input variable e, output variable a is the normalization and ascertained positions $P_1, P_2$ of the light sources. The setpoint output variables are the real image xr and the predefinable positions $P_{1,s}, P_{2,s}$. The correlation is ascertained separately in each case for the images and the positions. First machine learning system NN1 is trained to the effect that the positions of these light sources are output and the images are normalized, i.e., the light sources are removed again.

Second machine learning system NN2 is trained in the second step. In this case, the positions of objects with light sources (such as, for example, of a vehicle with headlights) are generated with reflections of temporal sequences of random scenes sz. Input variable e is the sequence of the positions of light sources at two consecutive points in time, setpoint output variables as are the positions and the velocities of the objects. Second machine learning system NN2 is trained to the effect that it correctly reconstructs the positions and the velocities of the objects.

The sequences from the first step and the second step may be arbitrarily selected.

Third machine learning system NN3 is trained in the third step. This takes place with the aid of a dataset X,Z, which includes sequences of input images $X=((z_{1,0}, x_{1,1}, \ldots, x_{1,t}), \ldots, x_{n,0}, x_{n,1}, \ldots, x_{n,t}))$ and for each sequence $(x_{k,0}, x_{k,1}, \ldots, x_{k,t})$ a list $(z_{k,0}, z_{k,1}, \ldots, z_{k,t})$ of the objects with attributes, positions, velocities and the ego velocity contained therein. The same objects in various input images are assigned to one another. A segmentation, which includes, in particular, the active light sources included therein, is also provided for each input image x. Associated normalizations xnorm, which are used as input variable e, are ascertained with first machine learning system NN1 from input images x of the data set. Setpoint output variables as are the objects and their positions. Third machine learning system NN3 is intended to be trained to correctly identify objects and to reliably reconstruct the positions.

With respect to the sequence of step 3, it should merely be noted that it should take place after step 1 has taken place, so that first machine learning system NN1 is already trained.

Fourth machine learning system NN4 is trained in the fourth step. In this case, entire object identification system 60 is used, to which input image x of the described dataset X,Z is fed. Output variable a in this case is output variable y of object identification system 60, the corresponding objects and attributes are maintained in the dataset as setpoint output variable as. Only parameters φ, which characterize fourth machine learning system NN4, are adapted in this case.

In terms of the training sequence, this step should be carried out last.

The methods carried out by training system 140 implemented as a computer program may be stored on a machine-readable memory medium 146 and may be carried out by a processor 145.

The term "computer" includes arbitrary devices for executing predefinable calculation rules. These calculation rules may be present in the form of software or in the form of hardware, or also in a mixed form of software and hardware.

What is claimed is:

1. A computer-implemented method for reliably identifying objects in a sequence of input images received using an imaging sensor, the method comprising the following steps:

ascertaining positions of light sources in each respective input image of the sequence of input images using a first machine learning system, to provide a sequence of the positions of the light sources; and identifying objects from the sequence of input images based on the sequence of the positions of light sources, using a second machine learning system, wherein:
  a normalization of the respective input image is also ascertained using the first machine learning system,
  the objects in the respective input image are identified from the normalization of the respective input image using a third machine learning system, and
  reliably ascertained objects in the respective input image are identified using a fourth machine learning system from the objects identified using the third machine learning system and the objects identified from the sequence of the positions of the light sources.

2. The method as recited in claim 1, wherein the first machine learning system is an artificial neural network.

3. The method as recited in claim 1, wherein in addition to the identifying the objects, attributes of the identified objects are identified in the sequence of input images using the second machine learning system.

4. A system for reliably identifying objects in a sequence of input images received using an imaging sensor, the system comprising:
  a first machine learning system;
  a second machine learning system, wherein:
    the system is configured to ascertain positions of light sources in each respective input image of the sequence of input images using the first machine learning system, to provide a sequence of the positions of the light sources, and
    the system is configured to identify objects from the sequence of input images based on the sequence of the positions of light sources, using the second machine learning system;
  a third machine learning system, wherein:
    the system is configured to ascertain a normalization of the respective input image ascertained using the first machine learning system; and
    the system is configured to identify the objects in the respective input image from the normalization of the respective input image using the third machine learning system; and
  a fourth machine learning system,
    wherein the system is configured to identify reliably ascertained in the respective input image using the fourth machine learning system from the objects identified using the third machine learning system and the objects identified from the sequence of the positions of the light sources.

5. A computer-implemented method for training a system for reliably identifying objects in a sequence of input images received using an imaging sensor, the system including a first machine learning system, and a second machine learning system, wherein the system is configured to ascertain positions of light sources in each respective input image of the sequence of input images using the first machine learning system, to provide a sequence of the positions of the light sources, and wherein the system is configured to identify objects from the sequence of input images based on the sequence of the positions of light sources, using the second machine learning system, the method comprising the following steps:

generating a scene including first objects and first light sources at predefinable positions in space; and generating a sequence of synthetic positions of the first light sources from the scene as they would be recorded by a camera from a predefinable camera position, the second machine learning system being trained to derive the position of the first objects from the sequence of synthetic positions of the first light sources, wherein the system further includes a third machine learning system, wherein the system is configured to ascertain a normalization of the respective input image ascertained using the first machine learning system, and wherein the system is configured to identify the objects in the respective input image from the normalization of the respective input image using the third machine learning system, and wherein the system further includes a fourth machine learning system, wherein the system is configured to identify reliably ascertained objects in the respective input image using the fourth machine learning system from the objects identified using the third machine learning system and the objects identified from the sequence of the positions of the light sources, and wherein the first machine learning system is trained initially before the third machine learning system, and the fourth machine learning system is trained last.

6. The method as recited in claim 5, wherein the first machine learning system is trained using a dataset, which includes pairs made up of augmented images and associated predefinable positions, the augmented images having been obtained by artificially adding light sources to real images at predefinable positions, and the first machine learning system being trained to ascertain the predefinable positions from the augmented images.

7. The method as recited in claim 6, wherein the first machine learning system is further trained using the dataset, which also includes pairs of real images and associated augmented images, and the first machine learning system being trained to ascertain as normalized data the associated real images from the augmented images.

8. A training device for training a system for reliably identifying objects in a sequence of input images received using an imaging sensor, the system including a first machine learning system, and a second machine learning system, wherein the system is configured to ascertain positions of light sources in each respective input image of the sequence of input images using the first machine learning system, to provide a sequence of the positions of the light sources, and wherein the system is configured to identify objects from the sequence of input images based on the sequence of the positions of light sources, using the second machine learning system, the device configured to:

generate a scene including first objects and first light sources at predefinable positions in space; and generate a sequence of synthetic positions of the first light sources from the scene as they would be recorded by a camera from a predefinable camera position, the second machine learning system being trained to derive the position of the first objects from the sequence of synthetic positions of the first light sources, wherein the system further includes a third machine learning system, wherein the system is configured to ascertain a normalization of the respective input image ascertained using the first machine learning system, and wherein the system is configured to identify the objects in the respective input image from the normalization of the respective input image using the third machine learning system, and wherein the system further includes a fourth machine learning system, wherein the system is configured to identify reliably ascertained objects in the respective input image using the fourth machine learning system from the objects identified using the third machine learning system and the objects identified from the sequence of the positions of the light sources, and wherein the first machine learning system is trained initially before the third machine learning system, and the fourth machine learning system is trained last.

9. A non-transitory machine-readable memory medium on which is stored a computer program for reliably identifying objects in a sequence of input images received using an imaging sensor, the computer program, when executed by a computer, causing the computer to perform:

ascertaining positions of light sources in each respective input image of the sequence of input images using a first machine learning system, to provide a sequence of the positions of the light sources; and identifying objects from the sequence of input images based on the sequence of the positions of light sources, using a second machine learning system, wherein:

a normalization of the respective input image is also ascertained using the first machine learning system, the objects in the respective input image are identified from the normalization of the respective input image using a third machine learning system, and reliably ascertained objects in the respective input image are identified using a fourth machine learning system from the objects identified using the third machine learning system and the objects identified from the sequence of the positions of the light sources.

* * * * *